(12) United States Patent
Rosso et al.

(10) Patent No.: US 11,585,320 B2
(45) Date of Patent: Feb. 21, 2023

(54) METHOD FOR CONTROLLING A MULTIPHASE SEPARATELY EXCITED SYNCHRONOUS GENERATOR IN A WIND TURBINE

(71) Applicant: Wobben Properties GmbH, Aurich (DE)

(72) Inventors: Roberto Rosso, Aurich (DE); Jair Cassoli, Aurich (DE); Sönke Engelken, Bremen (DE); Amgad Eldeib, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/642,345

(22) PCT Filed: Aug. 27, 2018

(86) PCT No.: PCT/EP2018/072980
§ 371 (c)(1),
(2) Date: Feb. 26, 2020

(87) PCT Pub. No.: WO2019/042919
PCT Pub. Date: Mar. 7, 2019

(65) Prior Publication Data
US 2020/0350842 A1    Nov. 5, 2020

(30) Foreign Application Priority Data
Aug. 29, 2017  (DE) .................... 10 2017 119 743.5

(51) Int. Cl.
*F03D 7/00*   (2006.01)
*F03D 7/02*   (2006.01)
(Continued)

(52) U.S. Cl.
CPC ............ *F03D 7/0272* (2013.01); *H02P 21/22* (2016.02); *H02P 2101/15* (2015.01); *H02P 2103/20* (2015.01)

(58) Field of Classification Search
CPC ...... H02P 21/0017; H02P 21/16; H02P 21/22; H02P 2101/15; H02P 2103/20;
(Continued)

(56) References Cited

U.S. PATENT DOCUMENTS 4,423,367 A * 12/1983 Blaschke ................ H02P 21/10
                                                                318/803
5,798,631 A    8/1998 Spée et al.
(Continued)

FOREIGN PATENT DOCUMENTS

DE   102009014012 A1   9/2010
DE   102010043492 A1   5/2012
(Continued)

OTHER PUBLICATIONS

Kowal, et al., "Comparison of Frequency and Time-Domain Iron and Magnet Loss Modeling Including PWM Harmonics in a PMSG for a Wind Energy Application," IEEE Transactions on Energy Conversion, 2015, vol. 30 (2), pp. 476-486.
(Continued)

*Primary Examiner* — Julio C. Gonzalez
(74) *Attorney, Agent, or Firm* — Seed IP Law Group LLP (57) ABSTRACT

A method for controlling a multiphase separately excited synchronous generator in a wind turbine is provided. The generator has a stator and an armature having an excitation input, connected to an excitation controller, for inputting an excitation current or an excitation voltage. The stator has a stator output, connected to a rectifier, for delivering stator currents. The rectifier is controllable to control the stator currents by detecting a speed of the armature or rotor,
(Continued)

determining a setpoint power to be delivered by the generator or the turbine based on the speed, determining an excitation current or voltage based on the detected speed and determined setpoint power, inputting the excitation current or voltage by excitation controller at the excitation input, determining the stator currents as setpoint stator currents based on the speed and the setpoint power, and controlling the rectifier to set the stator currents to the setpoint stator currents.

15 Claims, 5 Drawing Sheets

(51) Int. Cl.
  *H02P 101/15* (2016.01)
  *H02P 103/20* (2016.01)
  *H02P 21/22* (2016.01)

(58) Field of Classification Search
  CPC .... H02P 9/30; H02P 25/22; H02P 9/02; F03D 7/0272; F03D 7/045; F03D 9/25; F03D 15/20; G05B 13/048; F05B 2270/327; Y02E 10/72
  See application file for complete search history.

(56) References Cited

U.S. PATENT DOCUMENTS

| | | | |
|---|---|---|---|
| 7,663,348 B2 | 2/2010 | Oohara et al. | |
| 9,279,411 B2 | 3/2016 | Beekmann et al. | |
| 9,553,532 B2 | 1/2017 | Ito et al. | |
| 2012/0104756 A1* | 5/2012 | Beekmann | F03D 7/0272 |
| | | | 290/44 |
| 2012/0211983 A1* | 8/2012 | Tripathi | H02P 21/12 |
| | | | 290/44 |
| 2013/0182466 A1 | 7/2013 | Lu et al. | |
| 2013/0207589 A1 | 8/2013 | Margner et al. | |
| 2014/0084587 A1 | 3/2014 | Beekmann | |
| 2018/0013369 A1 | 1/2018 | Fujii | |
| 2019/0113020 A1 | 4/2019 | Messing et al. | |

FOREIGN PATENT DOCUMENTS

| | | |
|---|---|---|
| DE | 102011006670 A1 | 10/2012 |
| DE | 102016106590 A1 | 10/2017 |
| DE | 112016000455 T5 | 11/2017 |
| EP | 2672624 A1 | 12/2013 |
| JP | 2002315396 A | 10/2002 |
| JP | 2003235298 A | 8/2003 |
| JP | 2007124779 A | 5/2007 |
| JP | 2009091923 A | 4/2009 |
| JP | 2009516488 A | 4/2009 |
| JP | 2009174329 A | 8/2009 |
| JP | 2012521513 A | 9/2012 |
| JP | 2013251988 A | 12/2013 |
| JP | 2017135783 A | 8/2017 |
| RU | 2498494 C1 | 11/2013 |
| RU | 2577529 C1 | 3/2016 |
| WO | 2007/054729 A1 | 5/2007 |
| WO | 2014/181454 A1 | 11/2014 |
| WO | 2016117672 A1 | 7/2016 |

OTHER PUBLICATIONS

Nguyen, et al., "Self-Tuning Adaptive Copper-Losses Minimization Control of Externally Excited Synchronous Motors," IEEE International Conference on Electrical Machines (ICEM), 2014, pp. 897-902.

* cited by examiner

METHOD FOR CONTROLLING A MULTIPHASE SEPARATELY EXCITED SYNCHRONOUS GENERATOR IN A WIND TURBINE

BACKGROUND

Technical Field

The present invention relates to a method for controlling a multiphase separately excited synchronous generator in a wind turbine and also relates to a corresponding wind turbine.

Description of the Related Art

Wind turbines are known and convert wind energy into electrical energy by means of an aerodynamic rotor and an electrical generator coupled thereto. There are various generator designs. Doubly fed asynchronous machines, synchronous generators with constant excitation, that is to say with permanent magnets, and separately excited synchronous generators, in particular, are customary today. The present invention relates neither to the cited doubly fed asynchronous generators nor to the cited permanently excited synchronous generators, but rather relates to separately excited synchronous generators.

The distinction from doubly fed asynchronous machines is widely varied, which means that a doubly fed asynchronous machine can be regarded as foreign to the classification in question in regard to the generator and the generator control.

The difference over permanently excited synchronous generators is especially that the separately excited synchronous generators can also be controlled by means of the excitation. In this respect, separately excited synchronous generators should also be understood to mean that the armature of the synchronous generator is excited by means of an excitation current or an excitation voltage. Accordingly, the setting of the excitation current or of the excitation voltage can be used to influence the operating point. The term armature is used in the present case especially to avoid confusion with the aerodynamic rotor of the wind turbine, that is to say the rotor that has rotor blades that are moved by the wind.

Otherwise, a distinction is fundamentally also drawn between gearless and gear-based wind turbines. In gearless wind turbines, to which the present invention relates, in particular, the armature of the generator is mechanically coupled directly to the aerodynamic rotor, so that the armature and the aerodynamic rotor have the same speed during operation.

A separately excited synchronous generator can be controlled particularly by virtue of firstly the excitation current or the excitation voltage being set and secondly the power consumption, which—in simplified terms—results in control of the electrical load on the stator of the synchronous generator, being controlled.

Such controls take place substantially on the basis of the operating point of the wind turbine, which frequently also means that it takes place on the basis of the prevailing wind speed. There may alternatively be other reasons to change the operating point, such as, for example, an applicable direct or indirect requirement by the network operator of the electrical supply system to which the wind turbine supplies. Situations or stipulations relevant to safety or environmental protection can also necessitate a change of operating point.

In essence, a distinction is also drawn between a partial-load mode and a full-load mode. In the partial-load mode, at least in accordance with some control designs, a speed and power of the wind turbine are set on the basis of the prevailing wind speed. In the full-load mode, on the other hand, the wind turbine is limited to rated power and rated speed and hence operated on a fixed operating point in this respect at any rate. The limitation to rated speed and rated power is achieved in particular by adjusting the rotor blades, namely by virtue of their being rotated out of the wind as the wind increases, so that, despite the increasing wind, more power is not taken from the wind.

The operating point is usually set in the partial-load mode such that a constant blade angle assumed to be aerodynamically optimum is set for the rotor blades. The rotor blades are then driven by the wind and a speed is produced. On the basis of this speed, an output power for the wind turbine and hence ultimately the generator is produced. If this generator power corresponds to the power taken from the wind, an applicable stable operating point for speed and power is produced. Otherwise, the speed changes and a new power value is produced in accordance with the new speed until a stable operating point is found.

The power at the generator can likewise be set on the basis of a characteristic curve or a table, that is to say what is known as a lookup table. Said table can also store the excitation power to be set, that is to say the control current or the excitation voltage to be set.

In this respect, the wind turbine can also be controlled reliably and efficiently in principle. However, the characteristic curves or stored tables can prove inaccurate or at least capable of improvement, because, for example, they can reproduce dynamic processes poorly. Temporary changes, such as, for example, thermal influences, can also be reproduced poorly in a table or would require a further table level or table dimension. The same also applies to permanent differences, which may be caused, for example, by ageing processes. Nonlinearities, together with other influencing variables, such as, for example, the aforementioned temperature, may also be reproducible poorly in the table.

The use of less-than-optimum tables, even if they are only intermittently less than optimum, can result in performance losses. At least, it can lead to the wind turbine not operating at optimum performance.

This could be remedied by constant recalculation of the table entries, which is really complex, however, and may also be difficult or even impossible particularly if necessary input quantities for such a calculation are not known, or are difficult to ascertain.

The German Patent and Trademark Office performed a search for the following prior art in the priority application for the present application: C. D. Nguyen and W. Hofmann: "*Self-tuning adaptive copper-losses minimization control of externally excited synchronous motors,*" 2014 International Conference on Electrical Machines (ICEM), Berlin, 2014, pp. 897-902 (applicant), DE 10 2010 043 492 A1, DE 11 2016 000 455 T5, EP 2 672 624 A1, DE 10 2011 006 670 A1 and DE 10 2016 106 590 A1.

BRIEF SUMMARY

Disclosed herein is improving the control of a multiphase separately excited synchronous generator, in particular such that a power yield is at least increased, preferably optimized.

A method is provided.

Accordingly, a synchronous generator in a wind turbine is controlled. Said synchronous generator is multiphase and preferably has not only one three-phase system but rather multiple three-phase systems. Accordingly, the synchronous generator is also a multipole synchronous generator, in particular a slow-running ring generator in a gearless wind turbine.

Further, the synchronous generator is separately excited; it thus receives its excitation from the input of an applicable excitation power from outside, namely from an excitation controller. The synchronous generator, which has a stator and an armature, therefore has an excitation input on the armature in order to input the excitation power by means of an excitation current and an excitation voltage. To this end, the excitation input has an excitation controller connected to it, which can be in the form of a current controller, for example, and can excite the armature by inputting an appropriate DC current as excitation current. The excitation controller, that is to say, for example, said DC current controller, can also be used to set the amplitude of the excitation power by virtue of the excitation current being set by the DC current controller as appropriate, to remain with this example.

To deliver the generated power, the stator has a stator output at which stator currents are delivered. The multiphase nature of the synchronous generator relates especially to the stator currents. A synchronous generator having two three-phase systems, which is proposed as a preferred variant in the present case, therefore delivers six stator currents having different phases or delivers one six-phase stator current.

The stator output has a rectifier connected to it in order to rectify the stator currents and to provide them to a DC link connected to the rectifier. All the phases of the stator current, that is to say, for example, six phases, to remain with the above example, are thus rectified and provided in the DC link. This means that the generator power to be delivered is provided in the DC link. The DC link can invert the power thus provided, for example, by means of an inverter, for supply to an electrical supply system, and can match it to the requirements of the electrical supply system.

Additionally, the rectifier is controllable in order to control the stator currents. The task of the rectifier is thus not just to provide the power delivered by the generator in the DC link, but rather the rectifier also undertakes control of the generator by controlling the stator currents. Control of the stator currents thus also allows an operating point of the generator to be set or influenced.

The synchronous generator's system proposed in the present case and also taken as a basis for the further steps therefore allows control of the generator, in particular of its operating point, at least by means of the control of the excitation power, and the control of the stator currents allows further control of the generator, in particular of its operating point. The operating point of the generator can thus be controlled at least by means of these two intervention options.

The following steps for controlling and preparing the control are proposed for this system.

First, a speed of the armature is detected. This can be measured, or a value of the speed that is frequently present in the control anyway can be used. The detecting of the speed and also the further steps also described are basically performed continually in a recurring routine. Especially method steps for the detecting can also be performed at the same time.

Furthermore, a power to be delivered by the synchronous generator or the wind turbine is determined, which therefore forms a setpoint power. This is effected on the basis of the speed. In particular, this can be based on a speed/power characteristic curve that prescribes a relationship between speed and power and, accordingly, the speed is taken as a basis for inferring an associated power value from the speed/power characteristic curve and using it as setpoint power. Alternatively, one possibility is for further conditions to be taken into consideration such as, for example, external stipulations, which prescribe, for example, a speed reduction to reduce noise, or for other nature protection reasons, to cite just two examples.

Expressed in simplified terms, the excitation current, which is also always representative of the excitation voltage below, is chosen such that the setpoint power can be delivered. Expressed in simplified terms, an increase in the setpoint power also results in the excitation current being increased, which means that the generator can deliver this higher power. This is only one example for illustrative purposes, however, because it is fundamentally possible for just a speed increase at the same excitation power or with the same excitation current also to lead to an increased power output of the synchronous generator.

At any rate, the thus determined excitation current is then also used in the control of the generator, that is to say that it is input at the excitation input of the armature. The conversion can be provided by a current controller, as already described.

Additionally, stator currents to be delivered are also determined on the basis of the detected speed and the determined setpoint power. These thus determined stator currents then accordingly form setpoint stator currents. The power output of the generator is obtained substantially from the stator currents and the associated stator voltage at the stator output. For the overall balance of the generator, however, the excitation power applied by said current controller, for example, should also be deducted.

Furthermore, it is proposed that the rectifier is controlled such that the determined stator currents to be delivered at the stator output are set to the setpoint stator currents. The magnitude of the stator currents is obtained firstly from the synchronous generator, namely in particular from the set excitation power and the speed of the armature. Secondly, the stator currents are also dependent on the circuitry, which in the present case is formed substantially by the controlled rectifier. Fundamentally, there is also the possibility of a filter in the present case, which is connected to the stator output. Such a filter could also be provided by the controlled rectifier, however.

The control thus now works as follows. A speed of the armature is detected and this is taken as a basis for prescribing a setpoint power, and this is accomplished by setting an excitation current, and the rectifier is used to control the stator currents.

It is furthermore proposed that the determining of the excitation current or of the excitation voltage and, additionally or alternatively, the determining of the stator currents to be delivered, that is to say the determining of the setpoint stator currents, is effected by means of an adaptive control device. The excitation current or the excitation voltage and the stator currents to be delivered, that is to say the setpoint stator currents, form control variables for the control device in this instance. At least adaptive control of the excitation current or of the excitation voltage is thus proposed and, additionally or alternatively, adaptive control of the stator currents.

Adaptive control, that is to say control that adapts itself to something, is in this case control that adapts itself to parameters, but not to state variables in the control engineering sense.

The detected speed of the armature is therefore a state variable, and also the power to be delivered, that is to say the setpoint power, is likewise a state variable.

Parameters, namely system parameters, are properties of the system, that is to say, for example, an internal resistance or an inductance of the generator.

In accordance with one embodiment, it is proposed that parameters of the synchronous generator are estimated as estimate quantities for the synchronous generator by means of an estimating device, and the adaptive control device determines its control variables by taking into consideration the estimate quantities. The adaptive control device is therefore the one that controls the excitation current or the excitation voltage and, additionally or alternatively, the stator currents to be delivered as control variables. This control device then determines these control variables by taking into consideration the estimate quantities. In particular, the control device has at least one control law for this purpose, which in the simplest case can comprise a gain factor and/or at least one time constant. Such a control law can be adjusted or varied by taking into consideration the estimate quantities.

Estimation of parameters is therefore understood in the present case to mean in particular a parameter identification, not a state estimation.

Expressed in illustrative terms, there can be, for example, a relationship by means of a family of characteristic curves between the detected speed and the determined setpoint power, on the one hand, and the excitation current or the excitation voltage, on the other hand. The adaptation allows this family of characteristic curves to be varied, for example, displaced, on the basis of an estimate quantity, for example, to cite a simple example. This is then an example of adaptation of the control device.

Preferably, one or more magnetization inductances, a stator resistance and/or an excitation resistance are estimated as estimate quantities for the synchronous generator and then used to adapt the adaptive control device. The adaptive control device is then thus dependent on the one or more estimated magnetization inductances and/or on the estimated stator resistance and/or on the estimated excitation resistance.

In this instance, it has been recognized that particularly the three cited quantities, namely magnetization inductance, stator resistance and excitation resistance, may be variable or may be known inaccurately and can have a palpable influence, at any rate at some operating points, on the operating point or the selection or adjustment of the operating point. Additionally, it has been recognized that an immediate or direct measurement of one or more of these parameters of the synchronous generator is hardly possible, at least is encumbered by difficulties. Accordingly, an estimating method is proposed. Preferably, the estimating method works such that the estimation can take place during normal operation, that is to say can take place online.

Fundamentally, a parameter estimation may be complex and take up computing capacity and/or computing time. However, it has been recognized that the parameter estimation can be performed at a significantly lower repetition rate than the actual setting of the excitation current or of the excitation voltage and of the stator currents. There may thus be provision for a comparatively slow algorithm for estimating these parameters, and this also has the advantage that correspondingly rarer transmission of the estimated parameters can also be performed, that is to say transmission at a low transmission rate. This also allows transmission channels to be relieved of load, or the introduction of such a parameter estimation means that there is no need for considerable additional load to arise for these transmission systems.

Further, it has been recognized that particularly the magnetization inductance has an influence on the excitation current, more particularly on changes in the excitation current, and that an excitation current results in a different excitation power in the armature on the basis of the magnetization inductance. This can now be taken into consideration by virtue of the control device adaptively matching itself thereto.

An excitation resistance can also influence the excitation current or alter the effect of the excitation current in the armature, and this problem can be overcome by the adaptive control device.

A stator resistance influences particularly the stator currents or the multiphase stator current. The stator resistance can particularly also influence a reactive power component in the generator. The stator resistance results in a difference between the phase angle between stator current and stator voltage in the stator windings in comparison with the phase angle between stator current and output voltage at the stator output. This can now also be taken into consideration by the proposed adaptive control device if the stator resistance is estimated.

In accordance with one embodiment, it is proposed that the adaptive control device determines its control variables by taking into consideration a model of the synchronous generator and adapting the model or relationships derived therefrom on the basis of estimated quantities for the synchronous generator or the estimate quantities for the synchronous generator.

In particular, such a model is used or stored in the control device or associated calculation rules. This model can then be taken as a basis for adjusting particularly the cited magnitudes of the excitation current and the stator currents such that the desired response of the generator is obtained, in particular that the setpoint power determined on the basis of the detected speed is obtained. Taking into consideration the model of the synchronous generator may also help to set an optimum operating point. If the model of the synchronous generator is used, the desired setpoint power can also be found for the lowest possible losses. In other words, the currents involved, particularly the stator currents, can be selected and set to obtain optimum power.

The proposed adaptation and, in that case, the adaptation of the model on the basis of estimated quantities for the synchronous generator, as proposed in this embodiment, allow this model also to be tracked to actual changes in the model of quantities taken into consideration for the synchronous generator. In particular, this prevents the control device from determining or prescribing the excitation current and/or the stator currents on the basis of an incorrect model. In particular, the use of a model can be problematic if it differs too greatly from the actual system that it is supposed to portray. The proposed adaptation on the basis of estimate quantities for the synchronous generator avoids this problem, or at least reduces it.

In accordance with a further refinement, it is proposed that the wind turbine is in the form of a gearless wind turbine and, additionally or alternatively, the synchronous generator is in the form of a ring generator. The method is thus applied to a specific wind turbine of this kind. In the case of the gearless wind turbine, the armature of the generator is directly mechanically coupled to the aerodynamic rotor of the wind turbine. This means in particular that the armature rotates only very slowly, namely at the speed of the aerodynamic rotor. The rated speed of the aerodynamic rotor is in the range from 5 to 10 rpm, for example. This is preferably based on wind turbines of this kind, at least. This is then accordingly also the speed of the generator or of its armature during rated operation, and the speed is below that in the partial-load mode.

In accordance with this embodiment, the proposed method therefore relates to a slowly running generator. Particularly controlling such a generator can be significantly different than controlling a standard generator, which has a rated speed of 1500 or 3000 rpm. Such generators in a gearless wind turbine are frequently also unique to a certain degree, because they are each manufactured specifically for a wind turbine and this manufacture regularly has a large manual component.

The same applies for a proposed ring generator, which is distinguished in particular by a very large number of pole pairs, which is in particular at least 48, in particular at least 96 and in particular 192. A ring generator has its magnetically effective regions just in a ring in the region of the air gap. In particular, a ring generator is characterized in that it has no magnetically effective material or no magnetically effective regions in an inner region around its axis of rotation of a diameter of between 0 and at least 50% of its air gap diameter. In other words, this inner region contains, if at all, bearing structures or possibly ventilation support structures or the like. Such a ring generator also behaves quite differently than a conventional generator, which is designed for a speed of 1500 or 3000 rpm.

Additionally or alternatively, there are at least two three-phase systems in the stator. There is alternatively the possibility of four three-phase systems, for example. In this instance, each three-phase system substantially forms an independent stator system, with a common rotor being used. When there are two three-phase systems in the stator, they are preferably phase-shifted by 30 degrees in relation to one another. This allows good utilization of the generator to be achieved and in particular also a high level of smoothing during the rectification of these six phases. Nevertheless, this can necessitate a higher level of complexity for the model-dependent consideration.

Nevertheless, it has been recognized that the proposed adaptive control device and in particular the estimation of parameters allow a high level of quality to be achieved. At the same time, such an at least twice three-phase stator system can also achieve the effect that the individual stator currents, that is to say the phases of the overall stator current, can have particularly low current values. Additionally, there is also at least partial fail safety. At least, if one of two three-phase stator systems fails, the remaining one can still be operated even though the generator may then no longer be able to deliver rated power.

In particular, it is proposed that the model used for the synchronous generator portrays at least these two three-phase systems in the stator, that is to say portrays at least two three-phase stator systems.

Preferably, at least one inductance of the synchronous generator is operated in a range of saturation and at least one parameter that has changed as a result of this saturation is determined by the estimating device. Saturation of an inductance means that the magnetic flux density does not increase further or at least does not increase significantly further despite further increase in the magnetic field strength. This can regularly lead to the relevant component's response approaching that of a nonreactive resistor. It is thus possible, even if the saturation can be estimated with comparative difficulty, for such a parameter change to be detected by the estimating device. Accordingly, as a preferred implementation, the model used can be adapted accordingly.

Preferably, an operating point is consciously chosen at which the at least one inductance is operated in a range of saturation so as thereby to adapt the response of the synchronous generator accordingly. In particular, this relates to coupling inductances and can also relate to transformed inductances in that case. The saturation can be obtained physically both in a stator and in a rotor of the synchronous generator. The operating point is chosen in particular such that the magnetization inductances are operated in a saturation mode.

In accordance with one embodiment, it is proposed that the estimating device estimates parameters of the synchronous generator by taking into consideration at least one stator voltage and, additionally or alternatively, at least one stator current as an input quantity for estimating the parameters. Relevant parameters of the synchronous generator are estimable in particular from the stator voltage and/or the stator current. It has therefore been recognized that the relevant parameters can be estimated using the stator voltage and/or the stator current.

Preferably, all three voltages of one of multiple three-phase stator systems are used for parameter estimation. Additionally or alternatively, all three currents of one or the same three-phase stator system are used for estimation.

In this instance, it has been recognized that a three-phase system of the stator, in particular by using the applicable stator voltages or stator currents, can be used, in particular are sufficient, to estimate the relevant parameters of the synchronous generator. This is because it has been recognized that this is sufficient even if there are multiple three-phase stator systems. Even if these multiple three-phase stator systems fundamentally operate independently of one another, their parameters are still sufficiently similar as a result of the physical proximity. It has likewise been recognized that the use of one of multiple three-phase stator systems can also be sufficient for the estimation if a parameter or multiple parameters of the armature are estimated.

Independently of this recognition, it is preferably possible, particularly for redundancy purposes, but not only therefor, to propose using multiple instances of the three-phase stator systems for estimation, in particular all three-phase stator systems if there are more than two. The stator voltages and/or stator currents are then each detected and evaluated for estimation for this purpose too.

In accordance with one embodiment, it is proposed that the estimating device estimates d/q components of magnetization inductances of the synchronous generator as estimate quantities. A three-phase system can be transformed into d/q components in a known manner using what is known as the d/q transformation. These components then reproduce the underlying three-phase system with two components, the d and the q component, which are based on a rotating system, specifically which rotates together with the armature or rotor. Such components are accordingly also influenced by the inductive response of the synchronous generator, in particular of the stator. When d/q components are considered, an associated inductive response of the synchronous generator can also be split into a d component and a q component, that is to say referenced to the rotation of the armature. These components are also referred to as magnetization inductances of the generator $L_{md}$ and $L_{mq}$. In this regard, it is proposed that these two magnetization inductances, which therefore form d/q components of the magnetization inductance, are estimated. Preferably, the thus estimated d-q components of the magnetization inductance are then also used as part of a model of the synchronous generator. Details of an exemplary calculation will be explained below on the basis of equations, and it should also be recognized therein that there is additionally a relationship between the magnetization inductance, namely its d component, and the excitation current, because the d/q transformation is designed such that the d component of the transformed three-phase system reflects the magnetic flux density of the magnetic excitation. The excitation current can therefore also be regarded as a d component, this component basically corresponding to the excitation current, which is input as DC current anyway. There may also be a need for a conversion from the actually input excitation current to this d component of the excitation current.

It is pointed out that the term armature is used to denote the rotor of the generator in order to avoid confusion with the aerodynamic rotor of the wind turbine. The customary term in electrical engineering is rotor, however, and reference is thus occasionally made to rotor in connection with the generator in this case too, which should then be understood to be synonymous with the term armature. In particular, variables referenced to the rotor or armature are thus also referred to as rotor variables, such as, for example, a rotor field, which denotes a field referenced to the rotor or denotes the field of the rotor. Some variables thus also use the term rotor or an abbreviation thereof as an index.

It has particularly been recognized that the torque of the synchronous generator is directly dependent on the d-q components of the stator current, the d-q components of the magnetization inductance and the excitation current or the excitation current transformed for the stator. Knowing this relationship, which will also be specified later on in equation (1), the stator current or stator currents and the excitation current can be determined such that particularly losses are minimized. It should be noted that, as equation (1), which is yet to follow, will specify for two three-phase stator systems, multiple three-phase stator currents can be taken into consideration in the present case by virtue of each three-phase stator current having a separate d component and a separate q component. Accordingly, the torque is dependent on all d components and q components of all three-phase stator currents of the generator.

In accordance with a further embodiment, it is proposed that the adaptive control device determines the setpoint stator currents in d/q coordinates and the setpoint stator currents are transformed back into a three-phase representation with one current value per phase to control the rectifier, so as thereby to be better able to set the determined stator currents that are to be delivered to the setpoint stator currents. The calculation is thus effected in d/q coordinates, whereas individual phase currents are then respectively prescribed as setpoint currents, that is to say setpoint phase currents, to set these stator currents.

Preferably, the DC link is connected to an inverter and the inverter converts energy or power of the DC link into a three-phase current for supply to an electrical supply system. The particular effect that can be achieved thereby is that the controlled rectifier and the control of the excitation current mean that the synchronous generator is operated in as optimum a fashion as possible; at the same time, electrical power or electrical energy can be supplied to the electrical supply system independently thereof. In particular, the inverter can also freely prescribe the frequency and phase of the three-phase current to be supplied, regardless of the kind of operating point that the generator is operated at each time. Ultimately the generator then prescribes substantially only the power to be supplied, since only as much power as the generator produces can be supplied on an ongoing basis.

In accordance with a further refinement, it is proposed that the setpoint power is determined on the basis of the detected speed and on the basis of a detected power output of the generator or of the wind turbine overall. Thus, not only is the speed taken into consideration, but also the present power.

In particular, this is effected such that an intermediate power is determined from the detected speed. This intermediate power could also be referred to as theoretical setpoint power. From this intermediate power, which is therefore fixed as setpoint value, and the detected power output, which therefore forms an actual value, a control error is determined by means of a setpoint/actual value comparison. This control error is then passed to a controller, in particular to a PI controller, in order to determine the setpoint power as a result. This setpoint power to be determined is therefore the power to be set.

If, for example, the speed thus increases, leading to an increase in the intermediate power, a control error is initially produced that is then corrected, to explain it in illustrative fashion. This correction, in particular using a PI controller, allows differences between the power that should be set and the actual power to be compensated for. Additionally, such a controller can also be used to better influence the dynamic response of the power tracking. Preferably, such a controller, particularly said PI controller, is tuned to the dynamic response of the synchronous generator, in particular tuned to a ramp-up time constant of the generator, that is to say selected or parametrized on the basis of these ramp-up time constants.

In particular, it is proposed that the adaptive control device is controlled such that an efficiency of the generator is maximized. When a controlled rectifier used together with an adaptive control device is used, it becomes possible to better control the generator, in particular also to take into consideration variations in the generator. Particularly the stator currents can then be controlled selectively and as accurately as possible and it is also possible to consider excitation current and stator currents as a whole and to find an optimum overall combination. The particular effect that can be achieved thereby is that the desired power, that is to say the desired power output of the generator or of the wind turbine, is set such that said currents as a whole, that is to say cumulated, have the lowest losses. This is then consistent with the maximum efficiency of the generator for the power to be delivered that is desired at the moment.

In accordance with a further refinement, it is proposed that at least one magnetization inductance is estimated or determined by using a respective inductance characteristic curve. In this case, the inductance characteristic curve prescribes values of the respective magnetization inductance on the basis of a magnetization current, wherein values of the inductance characteristic curve are adapted from an initial characteristic curve little by little in the ongoing method by means of a or the estimation.

The inductance characteristic curve can also be implemented as a lookup table in which the values of the magnetization inductances are stored, wherein the values of the lookup table are adapted, that is to say improved, from initial values little by little in the ongoing method by means of a or the estimation.

In other words, it is accordingly proposed that initial values for the magnetization inductance are stored in the adaptive controller, for example, in the form of the inductance characteristic curve and/or the lookup table, and that these initial values are constantly updated with estimated values. The estimated values can be determined using an observer, using an estimation algorithm or by means of a calculation. This is based on the insight that the magnetization inductances can change in the course of operation. In particular, such a change may be caused by thermal action. Adaptation of the magnetization inductances allows for more accurate values for magnetization inductances to be taken into consideration for producing the stator currents.

Preferably, it is proposed that to determine the setpoint stator currents ($I_e$, $I_{qs1}$, $I_{qs2}$, $I_{ds1}$, $I_{ds2}$) a respective setpoint stator current characteristic curve is used for a respective one of the setpoint stator currents. The setpoint stator current characteristic curve indicates a respective relationship between the setpoint power to be delivered and the respective setpoint stator current to be determined. A respective one of the setpoint stator currents is determined in accordance with the respective setpoint stator current characteristic curve on the basis of the setpoint power to be delivered.

Besides the inductance characteristic curve, there may accordingly be a further characteristic curve stored in the adaptive controller, namely the setpoint stator current characteristic curve. The setpoint stator current characteristic curve serves the function of producing the setpoint stator currents ($I_e$, $I_{qs1}$, $I_{qs2}$, $I_{ds1}$, $I_{ds2}$) on the basis of the setpoint power to be delivered ($P_{vset}$). To this end, multiple setpoint stator current characteristic curves may respectively be stored for a setpoint stator current in the adaptive controller, which then respectively produces one of the setpoint stator currents in accordance with the respective setpoint stator current characteristic curve on the basis of the setpoint power to be delivered.

Moreover, it is proposed that at least one of the stator current characteristic curves, in particular each of the stator current characteristic curves, is adapted to changed conditions in a recurring routine. The at least one stator current characteristic curve is adapted on the basis of one, multiple or all quantities, such as estimated magnetization inductances ($\hat{L}_{md}$, $\hat{L}_{mq}$), an estimated stator resistance ($\hat{R}_{stator}$) or an estimated excitation resistance ($\hat{R}_{err}$). The changed conditions therefore relate particularly to the three aforementioned quantities, which can change in the course of operation. It is thus proposed that the stored stator current characteristic curves are changed or adapted, these being matched to the changed quantities. The cited estimated quantities are received from an estimating device or an observer that provides them. In regard to the inductance characteristic curve, the estimated magnetization inductances ($\hat{L}_{md}$, $\hat{L}_{mq}$) may accordingly also be the values of the inductance characteristic curve that are adapted little by little in the course of the method.

The recurring routine for adapting the stator current characteristic curves is performed less often than one of the setpoint stator currents is respectively determined in accordance with the respective setpoint stator current characteristic curve on the basis of the setpoint power to be delivered. By way of example, the recurring routine is repeated at a frequency in a range from 0.01 Hz to 10 Hz, whereas the setpoint stator currents can be calculated at a calculation frequency of between 1 kHz and 16 kHz. The recurring routine therefore relates to the process of updating the setpoint stator current characteristic curves. This routine is performed more slowly, for example, every minute, than the determining of the setpoint stator currents. The setpoint stator currents are, by comparison, produced at a high frequency required for actuating a converter, which can be in the kHz range, for example.

In accordance with a further refinement, it is proposed that the setpoint stator currents ($I_e$, $I_{qs1}$, $I_{qs2}$, $I_{ds1}$, $I_{ds2}$) are determined online on the basis of the setpoint power ($P_{set}$), specifically at least on the basis of one, multiple or all of the following quantities, namely the estimated magnetization inductances ($\hat{L}_{md}$, $\hat{L}_{mq}$), an estimated stator resistance ($\hat{R}_{stator}$) or an estimated excitation resistance ($\hat{R}_{err}$). Instead of determining the setpoint stator currents by using characteristic curves, a further alternative to determining them is accordingly to perform an online calculation. To this end, a calculation algorithm may be stored in the adaptive controller, said calculation algorithm calculating the setpoint stator currents ($I_e$, $I_{qs1}$, $I_{qs2}$, $I_{ds1}$, $I_{ds2}$) online from the previously ascertained estimate quantities ($\hat{L}_{md}$, $\hat{L}_{mq}$, $\hat{R}_{stator}$, $\hat{R}_{err}$). In a particular embodiment, this online calculation is performed at a frequency of between 5 Hz and 100 Hz, for example.

According to the disclosure, a wind turbine is also proposed that has a multiphase separately excited synchronous generator, wherein the synchronous generator has a stator and an armature,
the armature has an excitation input for inputting an excitation current or an excitation voltage,
the excitation input has an excitation controller connected to it for inputting the excitation current or the excitation voltage,
the stator has a stator output for delivering stator currents,
the output of the stator has a rectifier connected to it for rectifying the stator currents and for providing said currents to a DC link connected to the rectifier, and
the rectifier is controllable in order to control the stator currents, wherein the synchronous generator is controlled by virtue of
there being provision for speed detection for detecting a speed of the armature or aerodynamic rotor, and
there being provision for a control device, which is prepared
to determine a setpoint power, to be delivered by the synchronous generator or the wind turbine, on the basis of the detected speed, and
to determine an excitation current or an excitation voltage on the basis of the detected speed and the determined setpoint power,
the excitation controller is prepared to input the thus determined excitation current or the thus determined excitation voltage at the excitation input,
the control device is prepared
to determine the stator currents to be delivered as setpoint stator currents on the basis of the detected speed and the determined setpoint power and
to control the rectifier in order to set the determined stator currents to be delivered at the stator output to the setpoint stator currents, wherein for at least one of the steps of
determining the excitation current or the excitation voltage and
determining the stator currents to be delivered as setpoint stator currents,
the control device is provided as an adaptive control device, wherein the control device is configured so that the excitation current or the excitation voltage or the stator currents to be delivered form control variables for the control device.

A wind turbine is therefore proposed that in particular operates as has been explained above in regard to the method for controlling a multiphase separately excited synchronous generator. It is also based on a synchronous generator as explained in that regard.

Particularly, there is provision for speed detection, which does not have to be in the form of an additional measuring unit, however, but rather can also perform further processing on, for example, in a process computer, and forward a speed already detected by the wind turbine otherwise.

Particularly in consideration of external control elements, the control device can also use existing final control elements. It may be provided as a separate physical unit, but it may also be implemented and/or integrated in an existing control device. In particular, the control device may be stored as applicable program code on a control computer that is present anyway, and particularly may be embedded in the standard control of the wind turbine.

The circumstance that the control device is configured such that the excitation current or the excitation voltage and/or the stator currents to be delivered form control variables for the control device can particularly mean that the control device has applicable control outputs for these individual control variables. If the control device is provided as a physically separate item, such outputs for the control variables may be provided as connecting terminals, for example, or as a data output for a data bus or other data transmission device. In this regard, if it is not provided in physically separate form, the control device can also output the control variables as applicable program variables in a control program, however.

Preferably, there is provision for the wind turbine to use a method for controlling the multiphase separately excited synchronous generator in accordance with at least one above-described embodiment of such a method. The accordingly described advantages can therefore benefit this wind turbine and it can operate in correspondingly improved, preferably optimized, fashion.

BRIEF DESCRIPTION OF THE SEVERAL VIEWS OF THE DRAWINGS

The invention is explained in more detail below in exemplary fashion on the basis of embodiments with reference to the accompanying figures.

DETAILED DESCRIPTION

Figure 1:
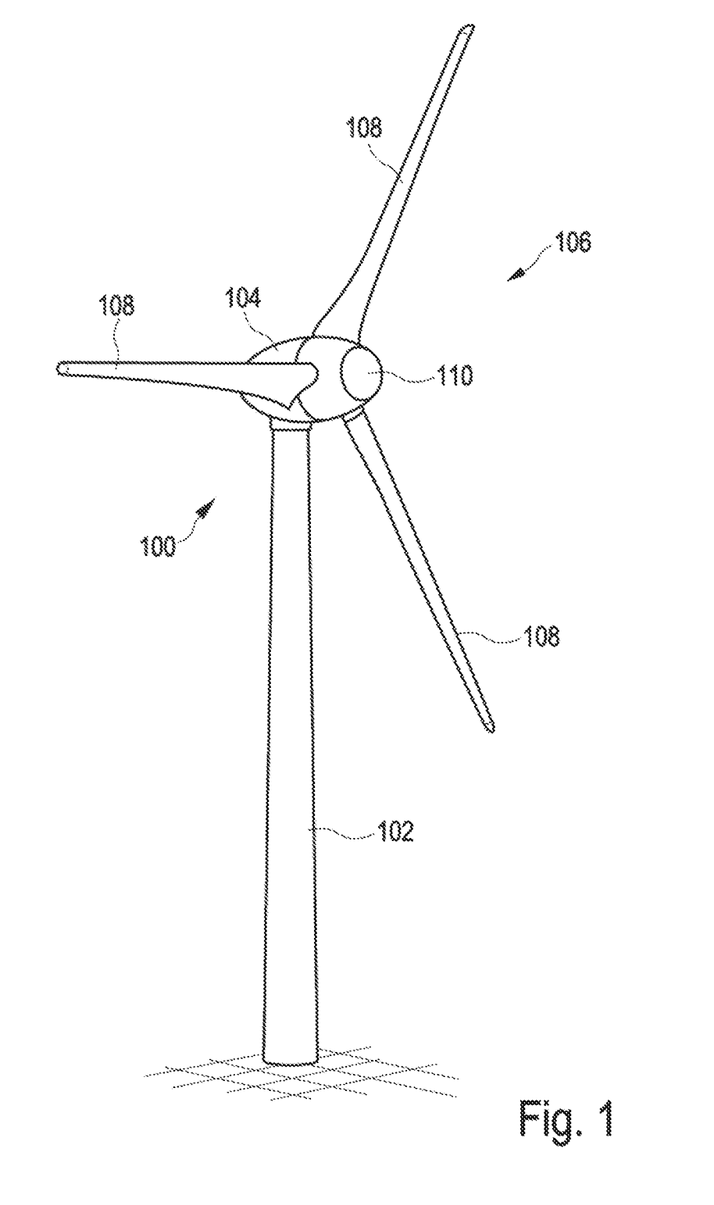
FIG. 1 shows a perspective depiction of a wind turbine.

FIG. 1 shows a wind turbine 100 having a tower 102 and a nacelle 104. Arranged on the nacelle 104 is a rotor 106 having three rotor blades 108 and a spinner 110. The rotor 106 is set in a rotary motion by the wind during operation and, as a result, drives a generator in the nacelle 104.

The disclosure relates to an adaptive control method for an adaptive rectifier for a separately excited six-phase synchronous generator. Such a system is proposed as part of a wind turbine as shown in FIG. 1. However, the disclosure could also be used for synchronous generators having more phases, in particular those having a number of phases multiplied by means of system division. The proposed control method affords the opportunity for online parameter identification and appropriate adaptation of the setpoint current values of the generator. In this case, the setpoint current values are chosen such that the efficiency of the generator at each operating point is optimized within the operating limits.

Further explanation of the method is provided below. For this, current and voltage variables are specified predominantly in a rotor-field-oriented d/q coordinate system. The conversion of stator-oriented time characteristics, sinusoidal for the purposes of simplification, to the dq coordinate system rotating with the rotor field is widely known and is explained in the literature. This conversion is assumed below.

The torque $T_e$ of a six-phase synchronous machine without damper windings can be described as follows:

$$T_e = \frac{3}{2}P(L_{md}(-i_{d1s} - i_{d2s} + i'_{fd})(i_{q1s} + i_{q2s}) - L_{mq}(-i_{q1s} - i_{q2s})(i_{d1s} + i_{d2s})) \quad (1)$$

where P denotes the number of pole pairs for the machine, $i_{d1s}$ and $i_{q1s}$ denote the d and q components of the stator currents of the first generator system, and $i_{d2s}$ and $i_{q2s}$ denote the d and q components of the stator currents of the second generator system. The first and second generator systems should be understood here to mean particularly the first and second stator systems. Furthermore, $i_{fd}'$ denotes the excitation current with reference to the stator and is defined as follows:

$$i'_{fd} = \frac{2}{3}\frac{i_{fd}}{N} \quad (2)$$

In equation (2), N denotes the number of turns for the machine and $i_{fd}$ denotes the untransformed excitation current, which can also be referred to as $i_e$ or $i_{err}$. $L_{md}$ and $L_{mq}$ in equation (1) are the magnetization inductances of the generator that need to be estimated. These inductances are saturation-dependent and can differ greatly from their rated values during operation, depending on the magnetization current $i_m$. A first estimate of $L_{md}$ can be obtained by means of a no-load test, according to the following equation:

$$L_{md} = \sqrt{\frac{2}{3}}\frac{V_{oc}}{\omega_e i'_{fd}} \quad (3)$$

where $V_{oc}$ denotes the RMS conductor-conductor no-load voltage and $\omega_e$ denotes the electrical rated frequency of the machine in rad s$^{-1}$. The magnetization current $i_m$ is defined as follows:

$$i_m = \sqrt{((i_{q1s}+i_{q2s})m)^2+(-i_{d1s}-i_{d2s}+i_{fd}')^2} \quad (4)$$

where $$m = \sqrt{\frac{L_{mq}}{L_{md}}}. \quad (6)$$

Figure 2:
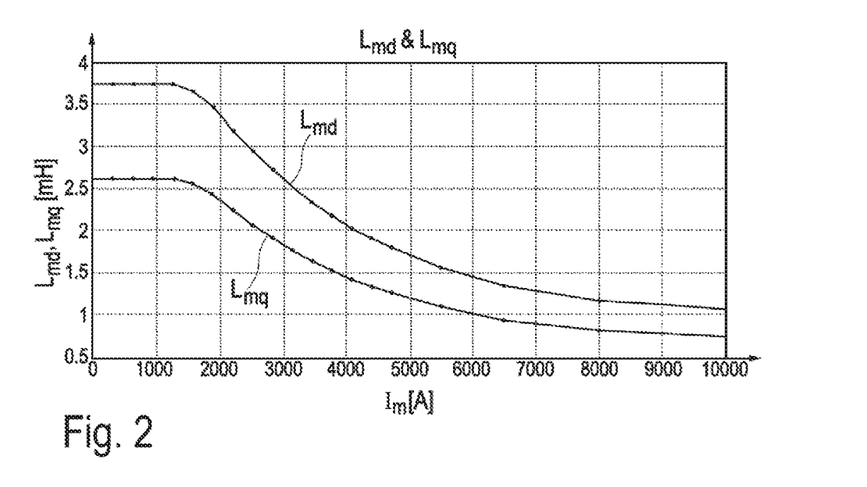
FIG. 2 shows values of d/q components of the magnetization inductance.

During the no-load test, no current flows in the stator, and therefore $i_m = i_{fd}'$. Analytical calculations on the basis of the generator geometry or by means of finite element simulations allow the trend of the change in the d and q components of the magnetization inductance as a function of $i_m$ to be estimated. This is depicted in FIG. 2.

For a specific generator operating point, defined by a speed and a setpoint power value, it is then possible to find an optimum combination of stator currents $i_{d1}$, $i_{q1}$, and $i_{q2}$ and excitation current $i_{fd}$ that is able to minimize the stator losses $P_{v\_stat}$ and excitation losses $P_{v\_rot}$. Assuming that each phase has the same resistance $R_s$ and each of the two stator systems obtains the same q and d setpoint current values $i_{qs}$ and $I_{ds}$, the aforementioned losses can be calculated as follows:

$$P_{v\_stat} = 6 R_s I_{srms}^2 \qquad (5)$$

Here, $I_{srms}$ is the RMS phase current, and this is defined as follows:

$$I_{srms} = \frac{\sqrt{I_{qs}^2 + I_{ds}^2}}{\sqrt{2}} \qquad (6)$$

The excitation losses are calculated by means of the following equation:

$$P_{v\_rot} = V_{err} I_{err} \qquad (7)$$

where $V_{err}$ is the excitation voltage and $I_{err}$ is the excitation current. However, the limited DC link voltage, also simply just called link voltage, means that not all optimum-loss operating points are attainable. This applies particularly if the rectifier operates as a step-up rectifier and thus the DC link voltage must always be above the RMS stator voltage by a specific factor.

A further limiting factor is the maximum current-carrying capability of the power-electronics elements in the rectifier, in particular of the semiconductor switches. It is thus proposed that the following constraints be taken into consideration:

$$I_{err} \leq I_{errMAX} \qquad (8)$$

$$\sqrt{I_{qs}^2 + I_{ds}^2} \leq I_{sMAX} \qquad (9)$$

$$V_s \leq \frac{V_{DCLink}}{\sqrt{3}} \rightarrow \sqrt{V_{qs}^2 + V_{ds}^2} \leq \frac{V_{DCLink}}{\sqrt{3}} \qquad (10)$$

Here, $$V_{qs} = \omega_r \lambda_{ds} - R_s I_{qs} \qquad (11)$$

$$V_{ds} = -\omega_r \lambda_{qs} - R_s I_{ds} \qquad (12)$$

and $\lambda_{ds}$ and $\lambda_{qs}$ are defined as follows:

$$\lambda_{ds} = L_{md}(-2I_{ds} + i'_{fd}) - L_{ls} I_{ds} \qquad (13)$$

$$\lambda_{qs} = L_{mq}(-2I_{qs}) - L_{ls} I_{qs} \qquad (14)$$

Here, $\omega_r$ is again the electrical speed of the operating point and $L_{ls}$ is the stray inductance of the stator. An iterative algorithm is used to calculate all possible setpoint stator and excitation current values that satisfy the illustrated constraints. This combination is chosen that minimizes the sum of the losses. It is also possible to use known gradient methods, or other methods for finding a maximum.

It has been recognized that generator parameters can change so greatly that making allowance for such changes can improve the control or automatic control. In order to calculate setpoint values matched thereto as well as possible, knowledge of the generator parameters $R_s$, $L_{ls}$, $L_{md}$ and $L_{mq}$ is useful. The stator resistance is temperature-dependent and can be calculated empirically using the following equation:

$$R_s(T) = R_{sT0}(1 + \alpha(T - T_0)) \qquad (15)$$

where $R_{sT0}$ is the nonreactive stator resistance for a specific temperature $T_0$, which can be 20° C., for example, and changes with the factor $\alpha$ on the basis of the temperature variation. The stray inductance $L_{ls}$ can be determined by means of a short-circuit test or by means of FEM simulations.

The rotor resistance $R_e$ can easily be calculated from the measured variables $V_{err}$ and $I_{err}$ as follows:

$$R_e = \frac{V_{err}}{I_{err}} \qquad (16)$$

If the generator is in a steady state, the q and d components of the stator voltage can be calculated by means of equations (11) and (12). Calculation in the steady state is thus proposed, because in the transient state it would be necessary to make allowance for the derivation of the respective flows in the two equations, which makes the calculation more complicated. Assuming that $R_s$ and $L_{ls}$ are known, $L_{md}$ and $L_{mq}$ can be calculated by means of the following equations:

$$L_{mq} = \frac{v_{ds} + R_s i_{ds} - \omega_r L_{ls} i_{qs}}{2 \omega_r i_{qs}} \qquad (17)$$

$$L_{md} = \frac{v_{qs} + R_s i_{qs} + \omega_r L_{ls} i_{ds}}{\omega_r(-2 i_{ds} + i'_{fd})} \qquad (18)$$

where $v_{qs}$, $v_{ds}$, $i_{qs}$, $i_{ds}$ are the instantaneous values of the applicable stator voltages and currents. Only one of the two stator systems needs to be considered in this case, because it has been recognized that these two stator systems can be assumed to be identical. The currents and voltages in equations (17) and (18) contain many harmonics, and it is therefore proposed that they be filtered. The switching frequency of the converter is dependent on the operating point. It is thus proposed that an operating point that is as unfavorable as possible for filtering be used—in particular, an unfavorable operating point is one at which there is a low switching frequency and/or a high harmonic load, which is assumed particularly in the case of high saturation —, and that this be taken as a basis for trimming the necessary filter time constants.

FIG. 2 shows the magnetization inductances $L_{md}$ and $L_{mq}$ in this instance as a function of the magnetization current $I_m$. The values of the magnetization inductance $L_{md}$ are approximately 50% to 100% above those of $L_{mq}$. In particular, it should be pointed out that the values of the magnetization inductances fall very early as the magnetization current rises, and fall to values of approximately 30% of their initial values. This is caused by saturation effects in essence. The characteristics shown can also change, however, particularly as a result of temperature fluctuations.

Figure 3A:
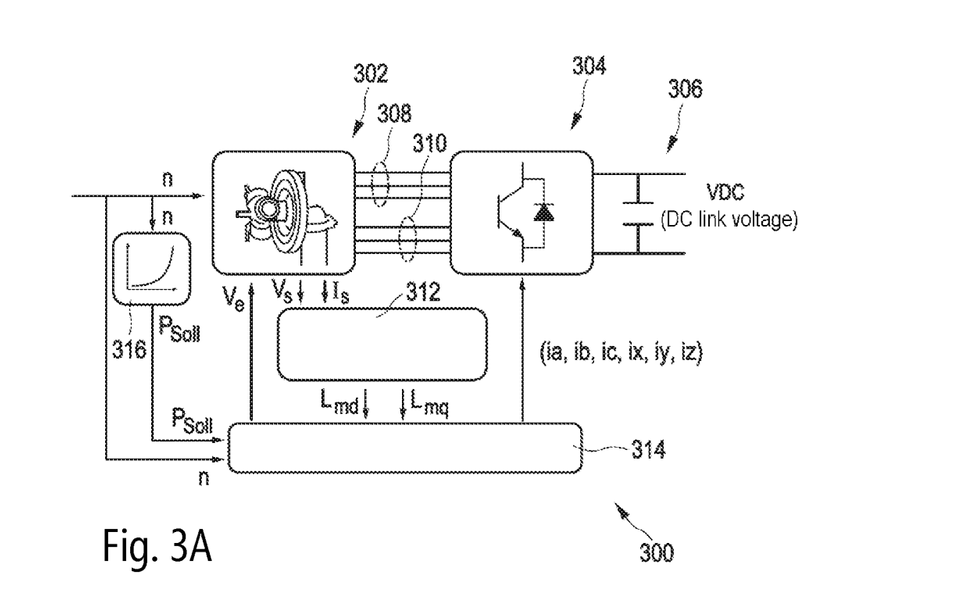
FIG. 3A shows a schematic depiction of a proposed controller structure.
Figure 3B:
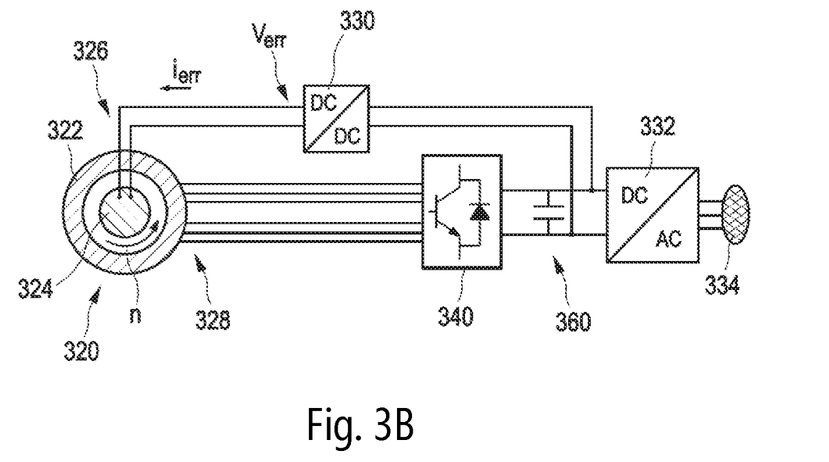
FIG. 3B schematically shows a generator with a connection structure.

FIG. 3B schematically shows a generator 320 with a connection structure. The generator 320 has a rotor or armature 324 that rotates in the stator 322 at the speed n. The stator 322 has a stator output 328 via which stator currents, specifically two three-phase stator currents in this instance, are provided to an active rectifier 340. The active rectifier 340 controls the stator currents and produces a DC voltage on the DC link 360, to which an inverter 332 is connected, in order to supply a three-phase current to an electrical supply system 334, this being indicated merely for illustrative purposes in the present case. The DC link 360 also has an excitation controller 330 connected to it that produces an excitation voltage $V_{err}$ or an excitation current $i_{err}$ for input into the armature 324 at an excitation input 326. This design is also the basis for FIG. 3B, and the generator 320 basically corresponds to the generator 302 in FIG. 3A. The active rectifier 340 in FIG. 3B also basically corresponds to the active rectifier 304 in FIG. 3A.

FIG. 3A shows an overview of a proposed control structure 300. The input signals for the algorithm are the speed n and the setpoint power value $P_{Soll}$, which is dependent on the speed by means of the power characteristic of the generator. An observer obtains the stator voltages and currents as input values and uses equations (17) and (18) to calculate the d and q components of the magnetization inductance.

The control structure 300 in FIG. 3A is based on a generator 302 and an active rectifier 304 that rectifies for a DC link 306. The generator 302 has two three-phase stator systems and thus uses two three-phase output lines 308 and 310 to deliver its stator current to the active rectifier 304 as dual three-phase stator current.

Part of the automatic control is formed by the estimating device 312, which can also be referred to as an observer, but in this instance estimates parameters, namely the two magnetization inductances $L_{md}$ and $L_{mq}$. The input quantities for the estimating device 312 are the stator voltage $V_S$ and the stator current $I_S$ in this regard. The values are obtained by the estimating device 312 from the generator 302. In this regard, it is also possible for these quantities to have already been captured otherwise and to be available in a control computer, for example, and for the estimating device 312 to be able to resort to these quantities therein. The estimating device 312 thus does not absolutely have to provide measuring means or devices of its own on the generator 302.

The result of the estimating device 312 is the two magnetization inductances $L_{md}$ and $L_{mq}$, or can also be referred to as the d and q components of the magnetization inductance. These two quantities are input into the adaptive controller 314.

The adaptive controller 314 additionally receives the present speed n and the present setpoint power value $P_{soll}$ as input quantities. The present setpoint power value $P_{soll}$ is obtained from a speed/power characteristic curve stored in the speed/power characteristic curve block, referred to in simplified terms as n-P block 316. The speed n describes the speed of the aerodynamic rotor, as the speed/power characteristic curve stored in the n-P block 316 matches the aerodynamics. This speed n therefore also has a decisive effect on the generator 302 and is therefore shown as an input variable for the generator 302. In the case of a gearless wind turbine as proposed in the present case, the speed n of the aerodynamic rotor corresponds to the speed of the generator, that is to say to the armature speed.

The adaptive controller 314 then uses the present speed n and the currently prescribed setpoint power $P_{soll}$ to calculate an excitation voltage $V_e$ that an excitation controller is supposed to provide in order to ensure an excitation power in the generator 302, which is embodied as a separately excited generator. Additionally, the adaptive controller 314 calculates setpoint values for the stator current, or setpoint values for the individual phase currents of the dual three-phase stator current. The reason is that the setpoint values for the three phase currents $i_a$, $i_b$ and $i_c$ for the first three-phase stator current and the values $i_x$, $i_y$ and $i_z$ of the second three-phase stator current are calculated or prescribed. These setpoint values for the stator current, or the components thereof, are then converted by the active rectifier 304.

For this calculation or stipulation, the adaptive controller 314 makes allowance for changes in the magnetization inductance by taking into consideration the applicable d and q components that it receives from the estimating device 312.

The values for the stator current, or the components thereof and the excitation power, or instead the excitation voltage, can therefore be matched to one another in optimum fashion by the adaptive controller 314. Additionally, changes in the properties of the generator 302 can be taken into consideration at that time.

Figure 4A:
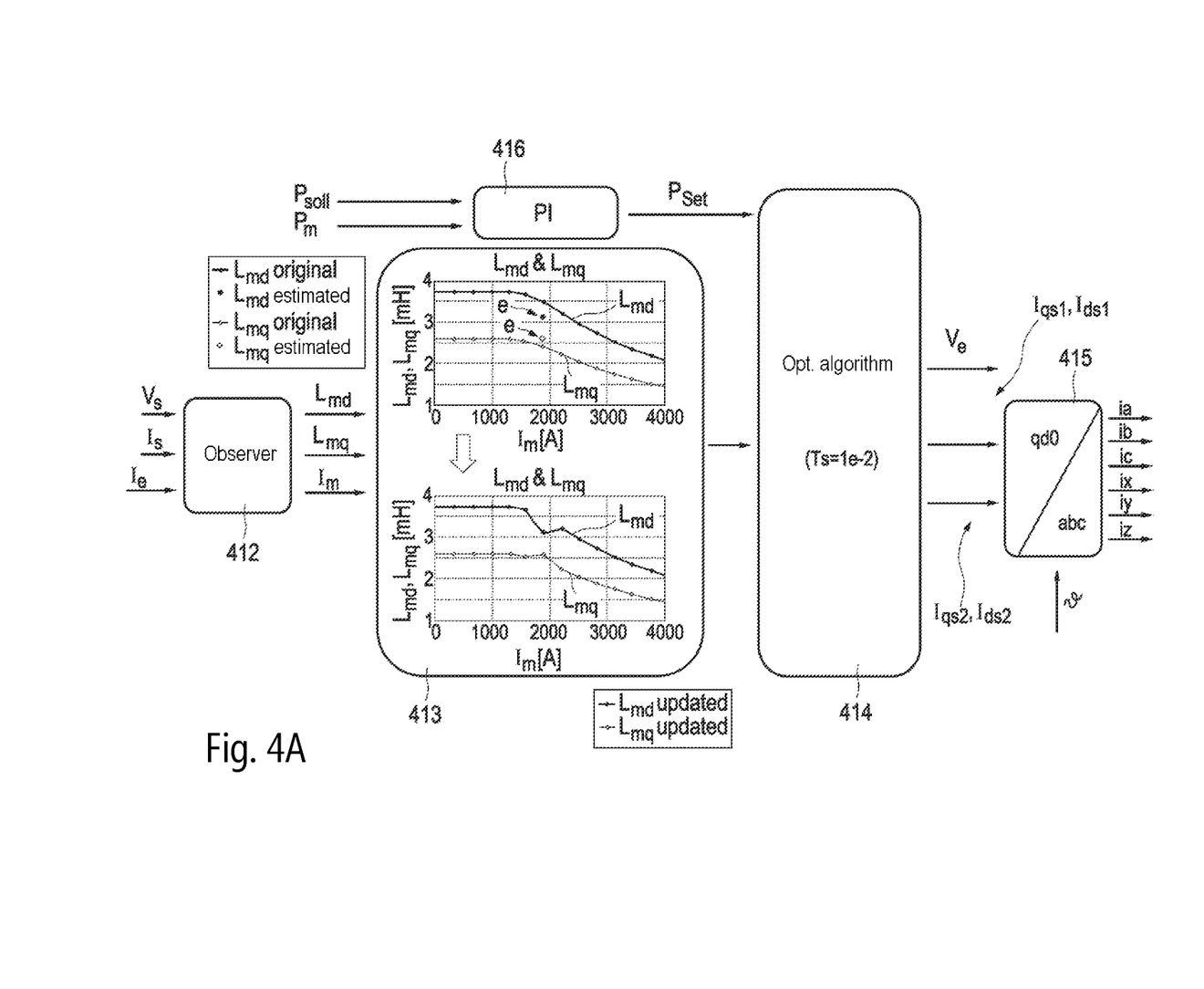
FIG. 4A shows details concerning the controller structure of FIG. 3A.

FIG. 4A shows further details and variations for the adaptive controller in FIG. 3A. It depicts an observer block 412, which, together with an adaptation block 413, can be equated to the estimating device 312 in FIG. 3A, for example. The observer block 412 receives the stator voltage $V_s$, the stator current $I_s$ and the excitation current $I_e$ as input quantities and observes therefrom the two components $L_{md}$ and $L_{mq}$ of the magnetization inductance and the magnetization current $I_m$, which it forwards to the adaptation block 413. The adaptation block 413, which can also be part of an adaptive controller in the spirit of the adaptive controller 314 in FIG. 3A, however, then adapts, at least inter alia, the values of the magnetization inductance. The adaptation block 413 is a symbolic illustration of a change in the characteristics of the two components $L_{md}$ and $L_{mq}$ of the magnetization inductance. The upper symbolic block corresponds to the diagram in FIG. 2, but only up to a magnetization current of 4000 A. This upper relationship is therefore the initial starting point for this adaptation block 413, which then, to this end, estimates a new value for each of the two components $L_{md}$ and $L_{mq}$ at the present operating point, which is denoted by the present magnetization current $I_m$. This is indicated in the adaptation block 413 in the upper depiction by the two arrows e that point to the two newly estimated values for $L_{md}$ and $L_{mq}$.

The characteristic curve for the two components $L_{md}$ and $L_{mq}$ of the magnetization inductance is changed accordingly, as indicated by the lower graph in the adaptation block 413. These two characteristic curves accordingly contain a kink, but, optimally, it is possible for further values of the characteristic curves to be adapted little by little too and to lead to an overall change in the characteristic curves.

The result is then provided to the optimization block 414, which can then produce setpoint values on the basis thereof. The parameters transferred from the adaptation block 413 to the optimization block 414 are not shown in detail in FIG. 4A, but at any rate the present values of the components $L_{md}$ and $L_{mq}$ of the magnetization inductance are transferred. It is also possible for completely altered characteristic curves for the characteristics of the components $L_{md}$ and $L_{mq}$ of the magnetization inductance to be transferred thereto, however. On the other hand, in this case too, the block diagram in FIG. 4A should be understood to be symbolic and all of the blocks can be implemented in a single process computer, and then the optimization block 414, or the optimization algorithm symbolized thereby, accesses the values that it needs, for example. The cyclic time chosen was 0.01 s (Ts=1e-2).

The optimization block 414 continues to receive a setpoint power value $P_{set}$ denoting the power value that currently needs to be set, namely for the power output to be delivered by the generator or the wind turbine.

This setpoint power value $P_{set}$ that actually needs to be set is the result of a setpoint power value controller 416, which is in the form of a PI controller in the present case. This PI controller 416 receives a desired power output $P_{soll}$ and an actual value of the present power output $P_m$, which therefore also denotes a measured power. If the setpoint power value is now changed, that is to say if $P_{soll}$ is changed, it is not desirable for an accordingly possibly sudden change to also thus be passed to the optimization block. Accordingly, there is provision for this setpoint P value controller 416, which tracks the power value $P_{set}$ that actually needs to be set at present to the prescribed setpoint power value $P_{soll}$ with a dynamic range.

The optimization block 414 then takes the cited inputs as a basis for calculating stator currents and an excitation voltage. The excitation voltage can be output directly as an excitation voltage $V_e$ that needs to be set. The stator currents that need to be set are initially output for each stator subsystem in d/q components. Accordingly, the values $I_{qs1}$, $I_{ds1}$, $I_{qs2}$, $I_{ds2}$ are output. However, they are initially provided to the transformation block 415, which transforms these d/q components into a, b, c components. The result for the dual three-phase stator systems under consideration is then six single instantaneous values, namely ia, ib, ic, ix, iy and iz. These six current values can then, as indicated in FIG. 3A, be provided to the active rectifier (304 in FIG. 3A) as instantaneous setpoint values. Otherwise, the transformation block 415 needs the present rotor angle θ, namely of the rotor of the generator, that is to say of the armature, to perform the transformation.

FIG. 4A therefore depicts the adaptive controller 314 of FIG. 3A, with further details. An optimization algorithm 414 calculates the setpoint excitation current value $I_{err}$, or the corresponding excitation voltage $V_{err}$, denoted as $V_e$ in FIG. 4A, and the setpoint stator current values $I_{qs}$ and $I_{ds}$. On the assumption of balance between the two stator systems, the setpoint current values for the two systems are identical.

The six stator currents of the six-phase generator are set on the basis of the desired power $P_{set}$ and hence the excitation voltage $V_e$. In this regard, it is useful to know the magnetization inductances $L_{md}$ and $L_{mq}$. The relationships in d/q components are provided particularly in equation (1) and in the additional explanations and equations. On the basis of equation (1), a recursive solution can be found, for example.

However, it has been recognized that the magnetization inductances are not constant, but rather may be dependent on the present operating point of the generator. In particular, they are dependent on the magnetization current, as shown in FIG. 2 and in the upper half of block 413 in FIG. 4A. Furthermore, however, it has also been recognized that the magnetization inductances may additionally be dependent on further quantities, in particular may be temperature-dependent. This means particularly that the characteristic curves shown in FIG. 2 are variable. It is proposed that this be taken into consideration.

The optimization block 414 makes allowance for the magnetization inductances $L_{md}$ and $L_{mq}$ being variable by using the respective present values. In this regard, it can find a recursive solution based on equation (1), for example, at the present operating point each time, and can take this as a basis for determining the stator currents $I_{qs1}$, $I_{ds1}$, $I_{qs2}$ and $I_{ds2}$ in d/q coordinates. It is naturally also possible for recursive solutions of this kind or other solutions to be determined beforehand and stored in a table, from which they are then retrieved during operation. Intermediate values can be interpolated.

The optimization block 414 therefore prescribes the stator currents that are set, and, for this purpose, at least adapts the magnetization inductances used. The magnetization inductances are parameters, and therefore the optimization block 414 is an adaptive controller or part of an adaptive controller.

In this regard, the optimization block 414 receives these magnetization inductances from the adaptation block 413. The adaptation block 413 is particularly supposed to illustrate that the magnetization inductances are subject to a change, and this change is also taken into consideration. The adaptation block 413 together with the optimization block 414 can therefore also be understood to be an adaptive controller.

In fact, the adaptation block 413 is used particularly to illustrate the assumed change. The initial starting point in this case, namely in accordance with the upper graph of the adaptation block 413, is a relationship between the magnetization current $I_m$ and the magnetization inductances, which was initially stored as a characteristic.

However, it has been recognized that there can be differences therefrom. In order to make better allowance therefor, magnetization inductances can then be observed for the respective magnetization current $I_m$, by an observer, this also being able to be referred to as estimation. The observer is represented as observer block 412. It can receive the excitation current $I_e$, the stator voltage $V_S$ and the stator current $I_S$ as input quantities and observe or estimate and output the magnetization inductances $L_{md}$ and $L_{mq}$ and the magnetization current $I_m$.

On that basis, the observer block 412 thus has the function of determining the magnetization inductances $L_{md}$ and $L_{mq}$ and the magnetization current $I_m$ from said input quantities.

This can be accomplished by using a conventional observer based on a system description, as provided particularly by equations (4), (17) and (18). Alternatively, the observer block 412 can use an estimation algorithm or a calculation to determine the magnetization inductances $L_{md}$, $L_{mq}$ and the magnetization current $I_m$. This can also be effected on the basis of equations (4), (17) and (18). Equations (4), (17) and (18) also relate to present measured values, which means that they involve actual influences, especially thermally independent influences, being used for the determination. The application of the equations therefore allows temperature-dependent changes to be detected and taken into consideration. The characteristic curve shown in FIG. 2 can therefore be improved accordingly.

The values thus observed for $L_{md}$, $L_{mq}$ and $I_m$ are subsequently input into the adaptation block 413 after they have been determined for an operating point by the observer block 413.

This is indicated by the two arrows "e" in the upper graph in the adaptation block 413. The arrow "e" therefore illustrates two values, determined by the observer block, for $L_{md}$ and $L_{mq}$ at a specific operating point in the upper graph of the adaptation block 413. These operating-point-dependent values for $L_{md}$ and $L_{mq}$ are transferred to the lower graph of the adaptation block 413 and result in the two kinks shown. Initial values are thus stored in the adaptation block 413 for the magnetization inductances, for example, in the form of a characteristic curve or a lookup table, which are then constantly updated with the present values from the observer block 413. The updated or adapted values for $L_{md}$, $L_{mq}$ and $I_m$ are subsequently transferred to the optimization block 414, which takes into consideration the updated values to determine the stator currents.

The adaptation block 413 therefore illustrates, particularly in comparison with FIG. 2, how the magnetization inductances are determined by the observer block 412 used and how the magnetization inductances, which change during operation, are determined in order to be able to subsequently take them into consideration in the optimization block 414 for the purpose of calculating the stator currents.

Figure 4B:
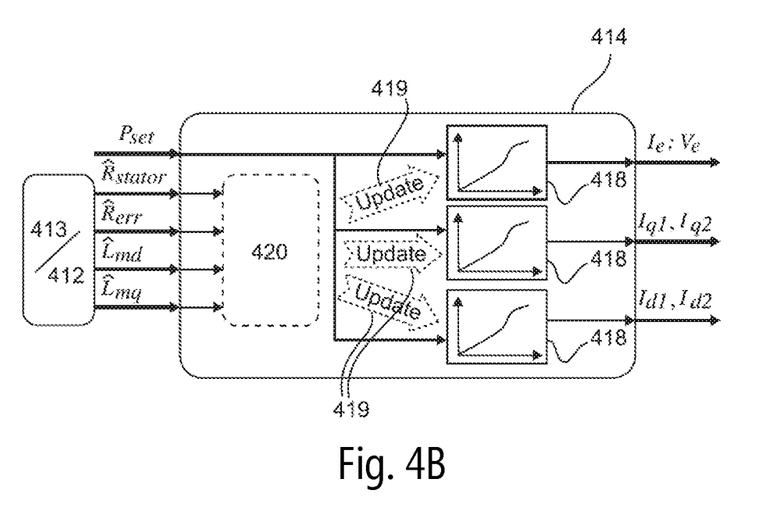
FIG. 4B shows details concerning the controller structure of FIG. 4A in one embodiment.
Figure 4C:
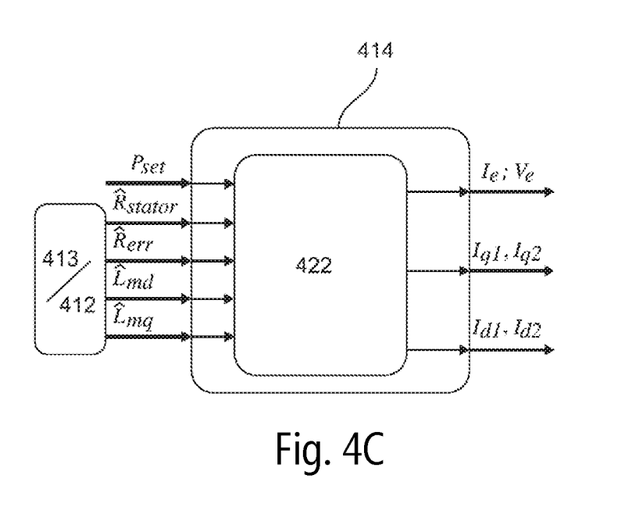
FIG. 4C shows details concerning the controller structure of FIG. 4A in an alternative embodiment.

FIGS. 4B and 4C each show embodiments or details pertaining to the controller structure of FIG. 4A, namely particularly how determination of the setpoint stator currents is implemented in the block 414.

In this regard, FIG. 4B shows the determination of the setpoint stator currents by means of characteristic curve calculation. To this end, the block 414 stores three setpoint stator current characteristic curves 418. Each of these three setpoint stator current characteristic curves outputs a setpoint current value on the basis of the setpoint power $P_{set}$ to be delivered, namely $I_e$ or $V_e$, $I_{qs1}$, $I_{qs2}$, $I_{ds1}$, $I_{ds2}$. These are subsequently transformed, as shown in FIG. 4A, but not shown in FIGS. 4B and 4C, into $i_a$, $i_b$, $i_c$ and $i_x$, $i_y$, $i_z$ and prescribed to the converter 304 as setpoint currents. The setpoint stator current characteristic curve therefore respectively indicates a relationship between the setpoint power to be delivered and the respective setpoint stator current to be determined.

In a further embodiment in FIG. 4B, illustrated by means of three dashed update arrows 419 and the block 420, the setpoint stator current characteristic curves 418 are adapted to changed conditions in a recurring routine. To this end, a recurring routine can be performed in the adaptive controller 414, namely in block 420, which is used to adapt the setpoint stator current characteristic curves 418. The adaptation is illustrated by means of the three update arrows 419. In this case, the recurring routine 420 takes into consideration changed conditions in the form of the estimated quantities, namely as the estimated magnetization inductances ($\hat{L}_{md}$, $\hat{L}_{mq}$), an estimated stator resistance ($\hat{R}_{stator}$) and an estimated excitation resistance ($\hat{R}_{err}$). These estimate quantities are provided by the err, observer block 412 or by the adaptation block 413, the adaptation block 413 storing the inductance characteristic curve. The setpoint stator current characteristic curves 418 are adapted more slowly than the setpoint stator currents that are determined from the setpoint stator current characteristic curves, in particular because $\hat{L}_{md}$, $\hat{L}_{mq}$, $\hat{R}_{stator}$ and $\hat{R}e_{rr}$ change correspondingly slowly during operation.

In an alternative embodiment to FIG. 4B, FIG. 4C shows a determination of the setpoint stator currents in the optimization block 414, namely by means of online determination or calculation. To this end, setpoint stator currents ($I_e$, $I_{qs1}$, $I_{qs2}$, $I_{ds1}$, $I_{ds2}$) are determined online on the basis of the setpoint power ($P_{set}$) and at least on the basis of one, multiple or all quantities $\hat{L}_{md}$, $\hat{L}_{mq}$, $\hat{R}_{stator}$ and $\hat{R}e_{rr}$. In this case, online means that the calculation can take place in the course of operation of the wind turbine. To this end, the block 414 stores a calculation algorithm 422 that calculates the setpoint stator currents from the cited estimate quantities. Such an algorithm may be stored in the adaptive controller, for example, in the form of calculation rules, and/or can be executed on a process computer. The cited estimate quantities are provided by the observer block 412 or by the adaptation block 413 in this case, analogously to FIG. 4B.

For the inductances, namely particularly $L_{md}$ and $L_{mq}$, values from one or more tables are used, which can also be referred to as "lookup tables." These one or more tables are updated on the basis of the magnetization current $i_m$ during generator operation, specifically whenever there is a steady operating state for a respective operating point. In the steady state, equations (11) and (12) describe the d and q components of the stator voltage, and the inductances $L_{md}$ and $L_{mq}$ can therefore be estimated by means of equations (17) and (18), and then the values can be updated.

In order to compensate for both modeling inaccuracies and ignored losses, a PI controller changes the setpoint power value of the control. This PI controller is active only in proximity to the setpoint power values and serves as a basis for setpoint current value generation until the desired power output is reached. In the event of large differences from the setpoint value, the I component can be deactivated. On account of a rather large time constant for the generator, the setpoint values are calculated at a low frequency, which can be 100 Hz for example, this being a comparatively low value in comparison with a maximum clock frequency of 10 kHz in standard microcontrollers.

Control of an active rectifier for a separately excited synchronous machine with optimized machine efficiency is therefore proposed. The separately excited synchronous machine can also be referred to as a separately excited synchronous generator. In particular control for a synchronous machine having two generator systems has been described. The method can alternatively be adapted for a different number of generator systems or stator systems; specifically, besides two three-phase systems, there is also the possibility of four or more stator systems.

Provided herein is operating a separately excited synchronous machine having multiple generator systems or stator systems and highly saturation-dependent parameters at optimized efficiency using an active rectifier. The saturation characteristic of the machine, or the estimate of the correct response of the magnetization inductance, can be achieved using the described solution and can be used for a control method for active rectifiers, and this also allows the saturation characteristic of the machine to be taken into consideration. Additionally, the presented solution is suitable for separately excited synchronous machines.

Literature references [a] and [b] cited below describe solutions for separately excited synchronous generators.

Literature reference [a] shows a method for controlling a separately excited synchronous machine. Setpoint current values are calculated analytically by means of the "Lagrange multiplier" method in order to minimize the total stator and rotor losses. A self-tuning algorithm is presented, which can change some parameters of the analytical calculation during operation, assuming that the machine is in the steady state. However, only the i_d component of the stator current and the excitation current i_err are adapted.

In regard to the parameter estimation, methods are often proposed that are based on RLS (Recursive Least Square) methods, or the like, and the assumption of the steady state is necessary for this in order to ignore the derivation of the flows. To improve matters, the estimation of the inductances $L_{md}$ and $L_{mq}$ in the proposed solution is based on a method in which the applicable parameters are simply calculated by means of algebraic equations.

The techniques described herein can be used, at least in some embodiments, for controlling a separately excited synchronous machine having multiple generator systems. Assuming that the parameters of the machine are consistent with the actual properties of the machine, the algorithm can calculate the respective globally optimum operating point in order to minimize the stator and rotor losses for a specific setpoint power. The method affords the opportunity to correct the lookup tables for the inductances by means of online parameter estimation, which can be performed by means of algebraic evaluation of the measured generator quantities, namely the voltages, the currents and the speed.

Since the operating points are determined by means of a numerical iterative calculation, an appropriate computing power is required. The problem has been recognized and the calculation can be performed at a lower frequency in comparison with the clock frequency of modern microcontrollers owing to the high mechanical inertia of the machine and the large time constant of the rotor.

THE VARIOUS REFERENCES

[a] Chi D. Nguyen and W. Hoffman, "Self-Tuning Adaptive Copper-Losses Minimization Control of Externally Excited Synchronous Motors," International Conference on Electrical Machines (ICEM) 2014, pp. 897-902, Sep. 2-5, 2014.

[b] D. Kowal, P. Sergeant, L. Dupre' and H. Karmaker, "Comparison of Frequency and Time-Domain Iron and Magnet Loss Modeling Including PWM Harmonics in a PMSG for Wind Energy Application," IEEE Trans. on Energy Conversion, vol. 30, no. 2, pp. 476-486, June 2015.

The invention claimed is:

1. A method for controlling a multiphase separately excited synchronous generator in a wind turbine, comprising:
    detecting a speed of an armature or aerodynamic rotor of the wind turbine, wherein:
        the synchronous generator includes a stator and the armature, and
        the armature has an excitation input for receiving at least one electrical quantity,
        an excitation controller is connected to the excitation input for inputting the at least one electrical quantity,
        the stator has a stator output for delivering stator currents,
        a rectifier is connected to the stator output for rectifying the stator currents and for providing the stator currents to a direct current (DC) link connected to the rectifier, and
        the rectifier is controllable in order to control the stator currents;
    determining a setpoint power to be delivered by the synchronous generator based on the speed and a detected power output of the synchronous generator or the wind turbine by at least:
        determining an intermediate power based on the speed;
        determining a control error based on comparing the intermediate power with the detected power output;
        providing the control error to a proportional-integral (PI) controller; and
        determining the setpoint power by the PI controller;
    determining the at least one electrical quantity based on the speed and the setpoint power;
    inputting, by the excitation controller, the at least one electrical quantity at the excitation input;
    determining setpoint stator currents based on the speed and the setpoint power, wherein the setpoint stator currents are setpoint values for the stator currents;
    controlling the rectifier to set the stator currents to be delivered at the stator output to the setpoint stator currents;
    estimating parameters of the synchronous generator, wherein the parameters include at least one of: magnetization inductances, a stator resistance, or an excitation resistance; and
    determining, by an adaptive controller, the at least one electrical quantity or the setpoint stator currents, wherein the adaptive controller determines the at least one electrical quantity or the setpoint stator currents based on the estimated parameters.

2. The method as claimed in claim 1, comprising:
    determining, by the adaptive controller, the at least one electrical quantity or the stator currents based on a model of the synchronous generator; and
    adapting the model or relationships derived from the model based on the estimated parameters.

3. The method as claimed in claim 1, wherein the wind turbine is a gearless wind turbine, the synchronous generator is a ring generator, and the stator has at least two three-phase systems.

4. The method as claimed in claim 1, comprising:
    operating at least one inductance of the synchronous generator in a range of saturation to cause at least one parameter to change; and
    detecting the at least one parameter.

5. The method as claimed in claim 1, comprising:
    estimating the parameters of the synchronous generator based on: at least one stator voltage of one or more three-phase stator systems, or at least one stator current of a three-phase stator system or at least one of a plurality of three-phase stator systems.

6. The method as claimed in claim 1, comprising:
    estimating d/q components of the magnetization inductance of the synchronous generator.

7. The method as claimed in claim 1, comprising:
    determining, by the adaptive controller, the setpoint stator currents in d/q coordinates; and
    transforming the setpoint stator currents into a three-phase representation with one current value per phase to control the rectifier to set the stator currents to be delivered to the setpoint stator currents.

8. The method as claimed in claim 1, wherein the DC link is connected to an inverter and the inverter converts energy of the DC link into a three-phase current for supply to an electrical supply system.

9. The method as claimed in claim 1, comprising:
    controlling the adaptive controller such that an efficiency of the synchronous generator is maximized.

10. The method as claimed in claim 1, comprising:
    estimating at least one magnetization inductance using an inductance characteristic curve for the at least one magnetization inductance, wherein the inductance characteristic curve specifies a relationship between values of the at least one magnetization inductance and a magnetization current; and
    incrementally updating the inductance characteristic curve.

11. The method as claimed in claim 1, comprising:
    determining one of the setpoint stator currents based on a respective setpoint stator current characteristic curve and the setpoint power to be delivered,
    wherein the respective setpoint stator current characteristic curve specifies a relationship between the setpoint power to be delivered and the one of the setpoint stator currents.

12. The method as claimed in claim 11, wherein the respective setpoint stator current characteristic curve is changed based on at least one quantity from a list including:
    the estimated magnetization inductances;
    the estimated stator resistance; and
    the estimated excitation resistance, and
    wherein changing the respective setpoint stator current characteristic curve is performed less frequently than the one of the setpoint stator currents is determined based on the respective setpoint stator current characteristic curve.

13. The method as claimed in claim 1, comprising:
determining the setpoint stator currents online based on the setpoint power and at least one quantity from a list including:
the estimated magnetization inductances;
the estimated stator resistance; and
the estimated excitation resistance.

14. A wind turbine, comprising:
a multiphase separately excited synchronous generator;
an aerodynamic rotor;
a stator having a stator output configured to deliver stator currents;
a rectifier, connected to the stator output, configured to rectify the stator currents and provide the stator currents to a direct current (DC) link connected to the rectifier, the rectifier being controllable to control the stator currents;
an armature having an excitation input configured to receive at least one electrical quantity;
an excitation controller connected to the excitation input; and
a controller, including a proportional-integral (PI) controller, configured to:
detect a speed of the armature or the aerodynamic rotor;
determine a setpoint power to be delivered by the synchronous generator based on the speed and a detected power output of the synchronous generator or the wind turbine by at least:
determining an intermediate power based on the speed;
determining a control error based on comparing the intermediate power with the detected power output;
providing the control error to the PI controller; and
determining the setpoint power by the PI controller;
determine the at least one electrical quantity based on the speed and the setpoint power, wherein the excitation controller is configured to cause the at least one electrical quantity to be provided at the excitation input;
determine setpoint stator currents based on the speed and the setpoint power, wherein the setpoint stator currents are setpoint values for the stator currents;
control the rectifier to set the stator currents to be delivered at the stator output to the setpoint stator currents, wherein the controller is configured as an adaptive controller for determining the at least one electrical quantity and the setpoint stator currents, and wherein the at least one electrical quantity or the stator currents are control variables for the controller; and
estimate parameters of the synchronous generator, wherein the parameters include at least one of: magnetization inductances, a stator resistance, or an excitation resistance.

15. The method as claimed in claim 12, wherein changing the respective setpoint stator current characteristic curve is performed at a frequency in a range of 0.01 to 10 Hertz (Hz).

* * * * *